J. R. ROYER.
BELT WHEEL CONNECTION FOR MOTOR CAR WHEELS.
APPLICATION FILED MAY 12, 1917.

1,280,856.  Patented Oct. 8, 1918.

Inventor,
Jesse R. Royer, by
G. C. Kennedy,
Attorney.

UNITED STATES PATENT OFFICE.

JESSE R. ROYER, OF JANESVILLE, IOWA.

BELT-WHEEL CONNECTION FOR MOTOR-CAR WHEELS.

1,280,856.         Specification of Letters Patent.      Patented Oct. 8, 1918.

Application filed May 12, 1917.   Serial No. 168,262.

*To all whom it may concern:*

Be it known that I, JESSE R. ROYER, a citizen of the United States of America, and a resident of Janesville, Bremer county, Iowa, have invented certain new and useful Improvements in Belt-Wheel Connections for Motor-Car Wheels, of which the following is a specification.

My invention relates to improvements in belt-wheel connections for motor-car wheels, and the object of my improvement is to provide means whereby a belt-wheel may be mounted removably upon one of the driving-wheels of a motor-car or the like, which will be quickly and easily mounted or demounted and which comprises a minimum number of parts.

Figure 1:
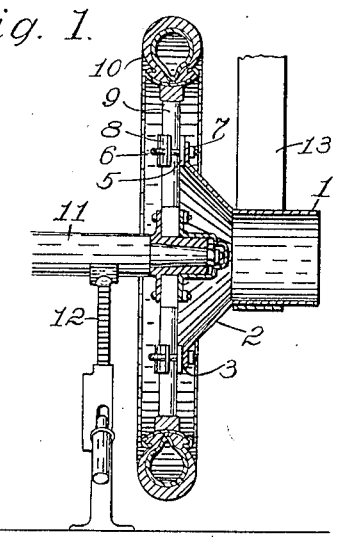
Figure 3:
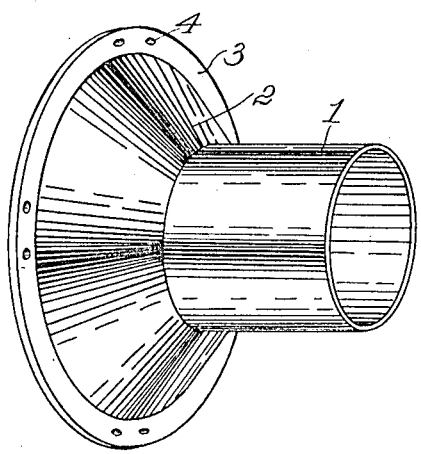
Figure 2:
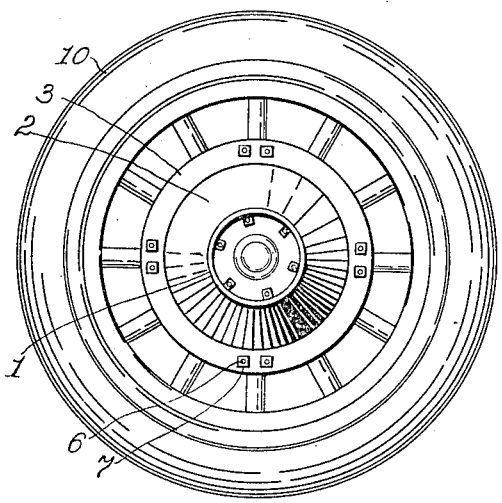
Figure 4:
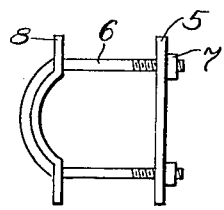

This object I have accomplished by the means which are hereinafter described and claimed, and which are illustrated in the accompanying drawings, in which Figure 1 is a vertical cross-section of a motor-car driving-wheel, showing it raised above the ground, and having a belt-carrying wheel mounted thereon by means of my improved connections; Fig. 2 is an elevation of said motor-car wheel with said belt-wheel mounted thereon; Fig. 3 is an enlarged perspective view of the belt-wheel and its connecting part for the driving-wheel, and Fig. 4 is an enlarged view of one of the U-bolts and securing means employed with my said device.

Similar numerals of reference denote corresponding parts throughout the several views.

The motor-car driving-wheel 10 is shown elevated from the ground level, by the means of a jack 12 applied to its axle-housing 11.

The belt-wheel 1 which carries a belt 13 is of cylindrical form having an integral frusto-conical part 2 with terminal annular flat rim 3 provided with a plurality of pairs of bolt-holes 4.

The rim 3 is positioned upon the drive-wheel 10 coaxially. Clamps 5 and 8 are first positioned upon opposite sides of certain of the wheel-spokes 9, said clamps being orificed in line to receive the limbs of U-bolts 6. These limbs are passed through the bolt-holes 4 in the rim 3, and the latter then removably secured by means of the nuts 7.

The belt-wheel is very readily mounted upon the driving-wheel after the latter has been elevated from the ground, and may be employed in the transmission of power to any kind of machinery.

Having described my invention, what I claim as new, and desire to secure by Letters Patent, is:

A belt-wheel connection for motor-car wheels comprising a hollow body portion, including a cylindrical belt-driving portion, a flange having apertures therein, and a frusto-conical portion connecting and continuous with the belt-driving portion and the flange, said apertures adapted to receive fastening-means whereby the body portion may be secured to a motor-car wheel.

Signed at Waterloo, Iowa, this 25th day of April, 1917.

JESSE R. ROYER.

Copies of this patent may be obtained for five cents each, by addressing the "Commissioner of Patents, Washington, D. C."